United States Patent [19]

Sieber et al.

[11] Patent Number: 4,794,403

[45] Date of Patent: Dec. 27, 1988

[54] WRITING SYSTEM

[76] Inventors: Jonathan D. Sieber; Joseph S. Sieber, both of 31 Granville Rd., Cambridge, Mass. 02138

[21] Appl. No.: 35,448

[22] Filed: Apr. 7, 1987

[51] Int. Cl.[4] ........................ G01D 9/00; G01D 15/24; G06F 15/626

[52] U.S. Cl. ............................ 346/33 R; 346/139 R; 364/520

[58] Field of Search ........................ 346/139 R, 33 R; 364/520

[56] References Cited

U.S. PATENT DOCUMENTS 3,127,678 4/1964 Muldoon ........................ 346/139 R 4,401,996 8/1983 Shirahata ........................ 346/139 R

*Primary Examiner*—E. A. Goldberg

*Assistant Examiner*—Mark Reinhart

[57] ABSTRACT

A calligraphic writing system of the type including an x-y plotter, a writing pen and a digital computer that controls the movement of the pen relative to the writing bed of the plotter. The system self-aligns the writing pen and items on the bed being written, and permits a number of items to be correctly positioned on the writing bed and to be written during a single cycle. The pen draws positioning marks on the writing bed, thereby insuring that the item(s) to be written on and the pen are properly aligned relative to each other. In embodiments in which a plurality of items (all of which may or may not be the same) may be written in one cycle, the computer determines how many sets can be placed on the writing bed at once, and draws positioning marks for each item of each complete set that will so fit.

16 Claims, 6 Drawing Sheets

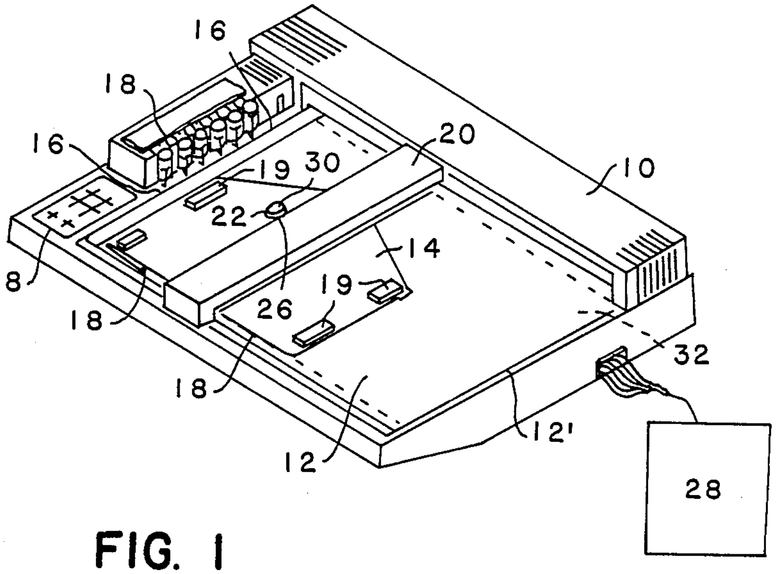
FIG. 1
FIG. 6
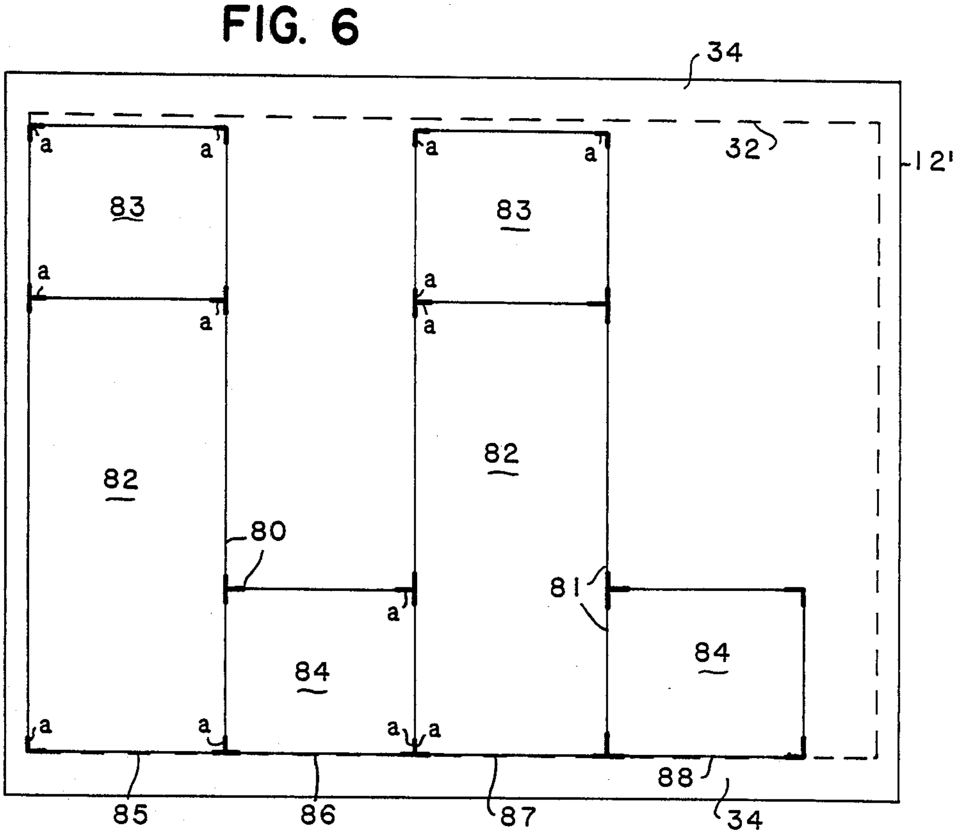

FIG. 9
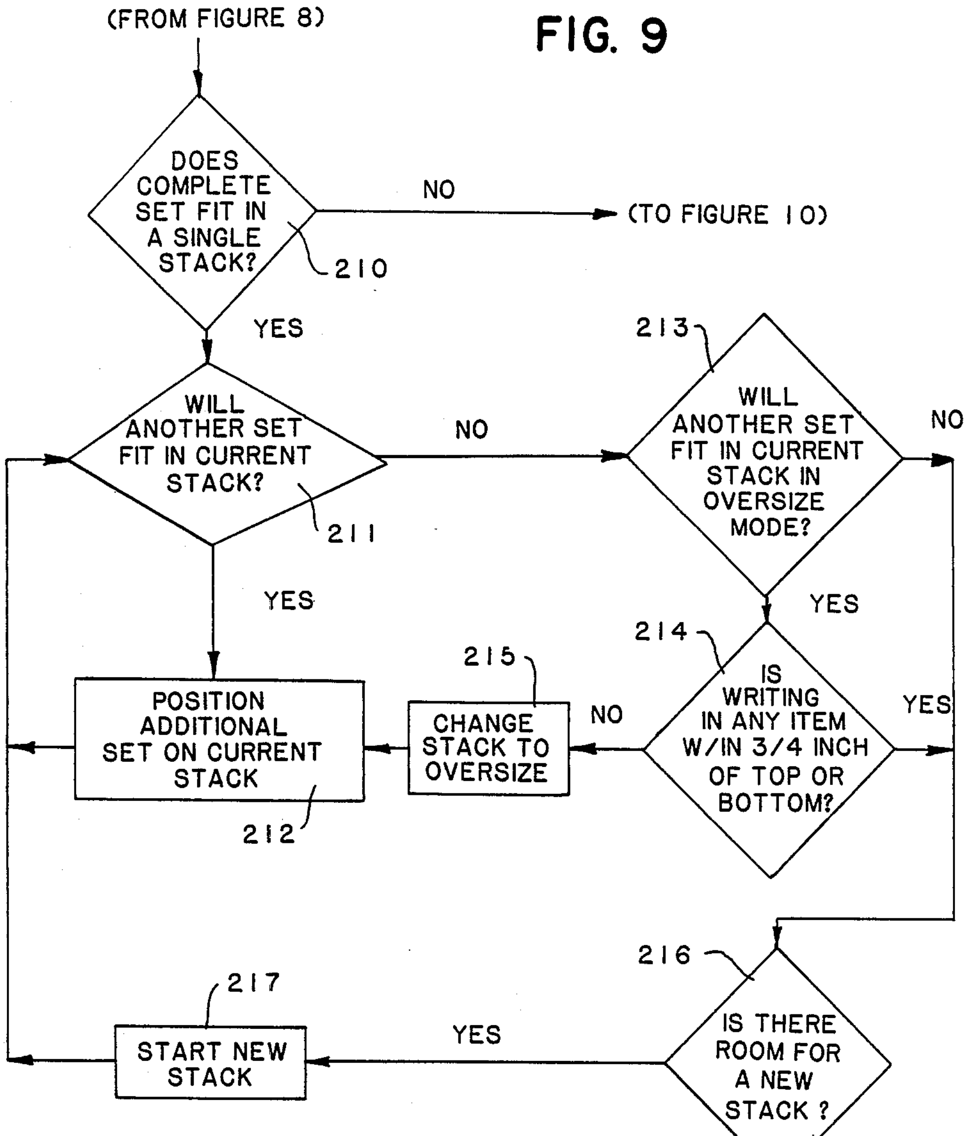
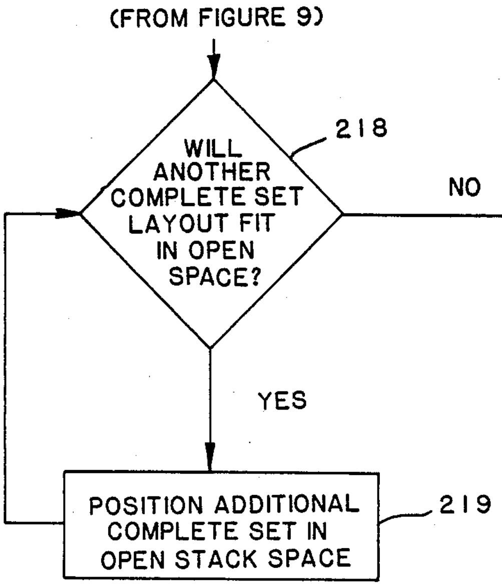
FIG. 10

WRITING SYSTEM

This invention relates to writing systems and, more particularly, to calligraphic systems employing an x-y plotter.

BACKGROUND

Applicants copending U.S. application Ser. Nos. 882,239 and 934,950, filed respectively on July 3, 1986 and Nov. 26, 1986 and here incorporated by reference, are directed to calligraphic writing systems of the type including an x-y plotter, a writing pen mounted for movement relative to the plotter, and a digital computer that controls the movement of the pen relative to the plotter. Such systems are currently being sold by Inscribe, Inc. of Cambridge, Mass., and are used for automatically writing such things as wedding invitations, envelopes, and table place cards, and for filling in blanks on preprinted diplomas and similar certificates.

In prior art systems, only a single card, envelope or sheet of paper was placed on the plotter writing bed at any one time. The correct location of the item to be written on was indicated by alignment marks at the bottom and along the left side of the writing bed. Precise alignment of the pen relative to the item to be written could be difficult to achieve; although the relative locations of the plotter bed and pen support structure remained the same, the exact location of the pen point relative to the support would vary somewhat depending on the particular pen, pen orientation, and pen point size.

SUMMARY OF THE INVENTION

The present invention provides a system for self-aligning the writing pen and item being written, and for permitting a number of items to be correctly positioned on the writing bed and to be written during a single cycle.

According to the present invention, the pen itself draws the positioning marks on the writing bed, thereby insuring that the item(s) to be written on and the pen are properly aligned relative to eahh other.

In preferred embodiments in which a plurality of items (all of which may or may not be the same) may be written in one cycle, the computer determines how many sets can be placed on the writing bed at once, and draws positioning marks for each item of each complete set that will so fit.

DRAWINGS

FIG. 1 is a perspective, partially schematic, view of system used in the practice of the present invention.

FIGS. 2–6 illustrate the positioning of different sets of items to be written on the writing bed of the system of FIG. 1.

FIGS. 7–10 are flow diagrams illustrating a writing method according to the present invention.

DETAILED DESCRIPTION

Figure 2:
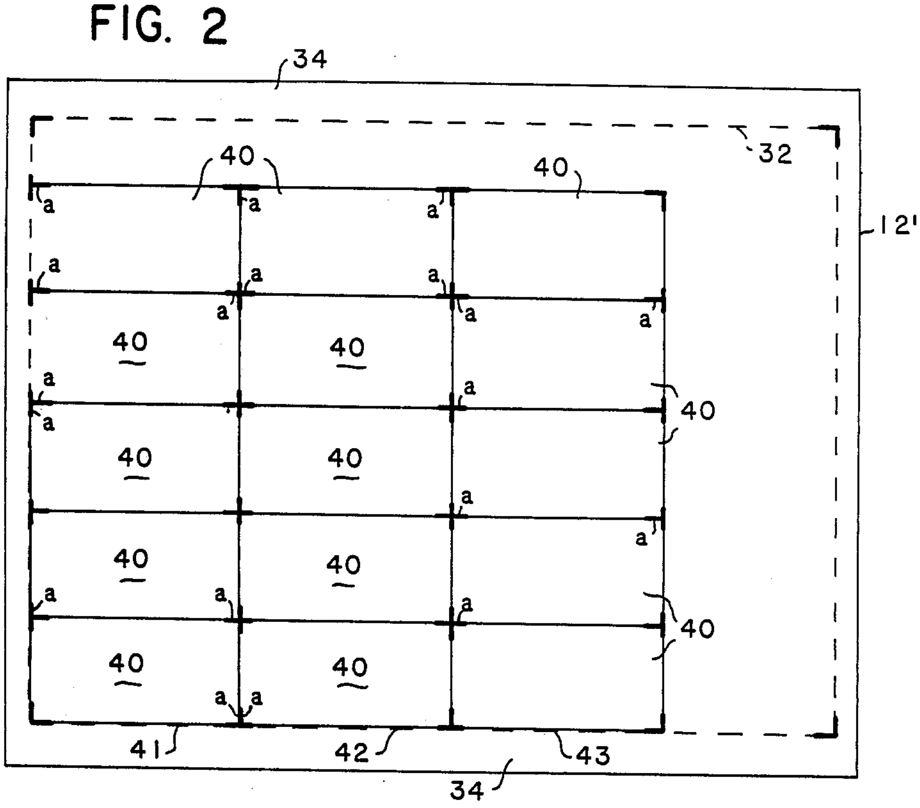

Referring to FIG. 1, a digital x-y plotter 10, suitable for use in practicing the present invention, has a writing table or bed 12 on which the sheets of paper, envelope(s), card(s) or other media on which images are to be written may be positioned. In FIG. 1, a single envelope 14 is shown positioned on the table. As shown, the left and bottom edges of the envelope are aligned with side and bottom locating marks, designated 16, 18 respectively, on table 12 and the envelope is held in the correct position on the table by magnets 19.

Plotter 10 includes a control panel 8, a pen stocker 18 having at least one pen holder, a slider 20, a carriage 22 mounted in slider 20 and a pen holder 26 attached to carriage 22. Pen stocker 18 is positioned at the left of table 12 (beyond the left edge of the writing surface of the table) and contains one or more calligraphic pens in its pen holders. Slider 22 extends the full height (i.e., the full "y" dimension) of table 12 and is movable back and forth across the full width (i.e., the full "x" dimension) of table 12 under the control of digital computer 28 (e.g., Epson Model Equity II). Carriage 22 is movable up and down in the "y" direction, along the left edge of slider 20, again under the control of computer 28.

Thus, by combined movement of slider 20 and carriage 22, a calligraphic pen 30 mounted in pen holder 26 attached to carriage 22 may be positioned at any point on table 12, and may be moved in any direction along the table. Carriage 22 (and pen 30 in pen holder 26) may also be moved a short distance towards and away from the table. A downstroke command from computer 28 moves carriage 22 from its "up" position towards table 12 and into its "down" position in which pen 30 is in contact with an envelope or other document on table 12 for writing an image thereon. Similarly, when the carriage 22 is in its "down" position, an upstroke command from computer 28 moves the carriage away from table 12 and into the "up" position, in which pen 30 is spaced above table 12 and may be moved without writing an image.

In operation, pen holder 26 is brought into proximity with a selected one of the stocker holders under control of panel 8 or digital computer 28, and a selected pen is pickeduup by pen holder 26. The plotter then operates either under control of panel 8 or under control of a program in computer 28 in a standard manner to move slider 20 and carriage holder 22 through selected paths to cause a desired image or images to be plotted/written on the paper or other medium positioned on table 12. Normally, a paper cover sheet 12′ is placed directly on table 12, and the envelope or other document(s) to be written on is placed on top of sheet 12′.

The plotter and sequence of operations described to this ponnt are conventional. An example of a plotter which operates in the manner indicted is the model NPS-P6 manufactured by Sekonic Co., Ltd, Tokyo, Japan.

The overall writing area of table 12 (i.e., the area that can be written on by pen 30) is 280 mm (about 11 inches) high (i.e., in the "y" direction) and 385 mm (about 15⅛ inches) wide (i.e., in the "x" direction). This area, designated 32, is shown in dashed lines in FIG. 1.

The configuration of slider 20 and carriage 22 is such, however, that a paper sheet 12′ about 320 mm (about 12½ inches) high (i.e., in the "y" direction) will fit on table 12, leaving about 20 mm (about ¾ inch) margins 34 at the top and bottom of sheet 12′ that cannot be written on. As will be evident, an envelope or other document may be positioned partially within margins 34 so long as no writing need be done on the portions within the margins.

Reference is now made to FIGS. 2–5 which illustrate a number of arrangements of documents on table 12.

FIG. 2 illustrates an arrangement of table place cards 40, each of which is 2 inches high and 4 inches wide. As shown, a total of fifteen cards 40 are arranged in three vertical stacks, designated 41, 42, 43, each including 5 cards. In each stack, the left edges of the cards are aligned with each other, the top edge of each card abuts the bottom edge of the card above it, the left side of the far left stack 41 is at the left edge of writing area 32, and the left edge of each other stack is at the right edge of the stack immediately to its left. The lower left cover of the card 40 in the left-most stack 41 is at the lower left corner of the effective writing area 32 of plotter 10. The overall height (about 12½) of table 12 would permit each of stacks 41, 42, 43 to be six cards high but the writing to be done on the cards 20 extends to within ⅜ inch of the card top and bottom so only a five-high stack of cards ca be used; the pen 30 would not be able to write on all the desired areas of the top and bottom cards of a six-card stack.

Figure 3:
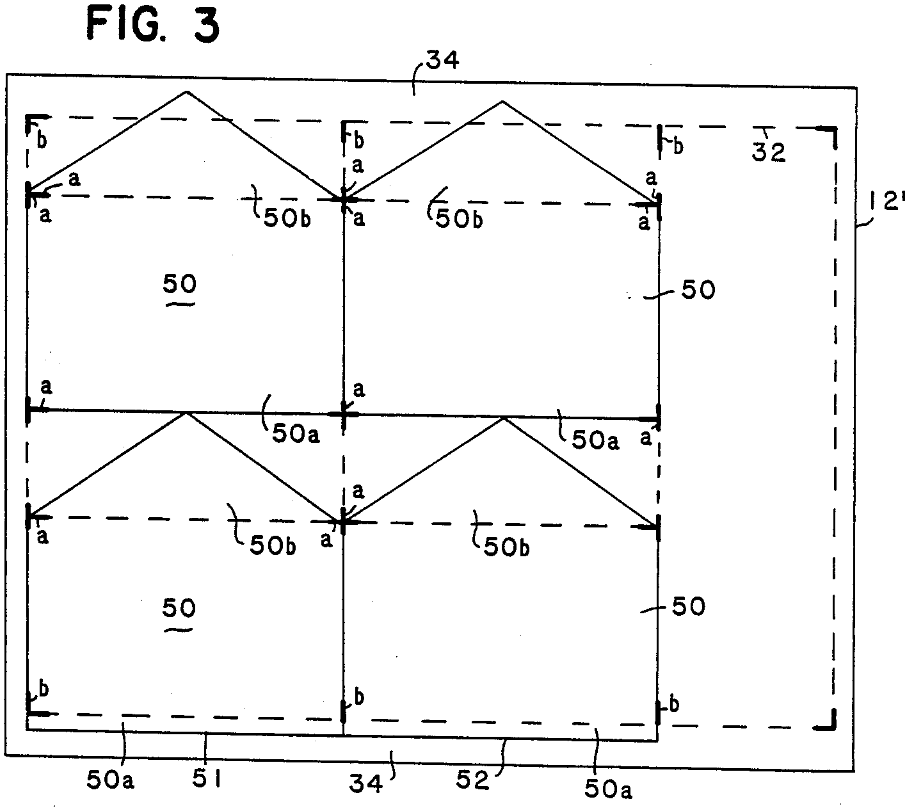

FIG. 3 illustrates an arrangement of envelopes 50. Each envelope is about 6 inches wide and (including its open flap), about 6 inches high. In FIG. 3, a total of four envelopes 50 are arranged in two vertical stacks, designated 51, 52 respectively, each including two envelopes. The lower edge of the bottom envelope in eachsstack is about ¼ inch from and aligned with the bottom of paper 12', i.e., is below the bottom edge of writing area 32, and the pointed end of the flap of the envelope in each stack similarly extends above the top edge of writing area 32. The envelopes are too tall to stack two envelopes, one-above-the other, within the 11 inch height ("y" direction) of area 32. Utilization of the additional 1½ inches of height provided by margins 34 makes such stacking possible; two envelopes will fit in the 12½ inch high space and no writing is to be done on the portions of the envelopes within the margins 34.

Figure 4:
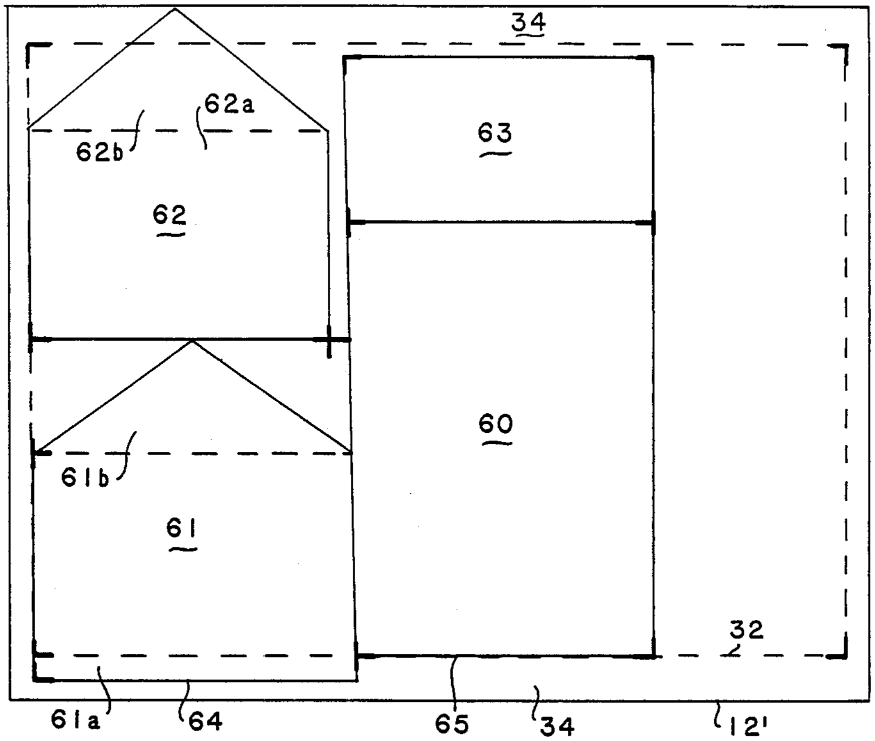

FIG. 4 illustrates an arrangement of a wedding invitation 60, an outside envelope 61, an inside envelope 62, and a reception card 63. As shown, the outside envelope 61 and inside envelope 62 are in one stack, designated 64, the top and bottom of which eextend (as in FIG. 3) beyond the top and bottom edees of effective writing area 32. The invitation 60 and reception card 63 are in a second stack, designated 65, which (since writing will extend to closely adjacent the bottom of invitation 62) is positioned with the bottom of the stack (i.e., the bottom of invitation 60) at the bottom of area 32.

Figure 5:
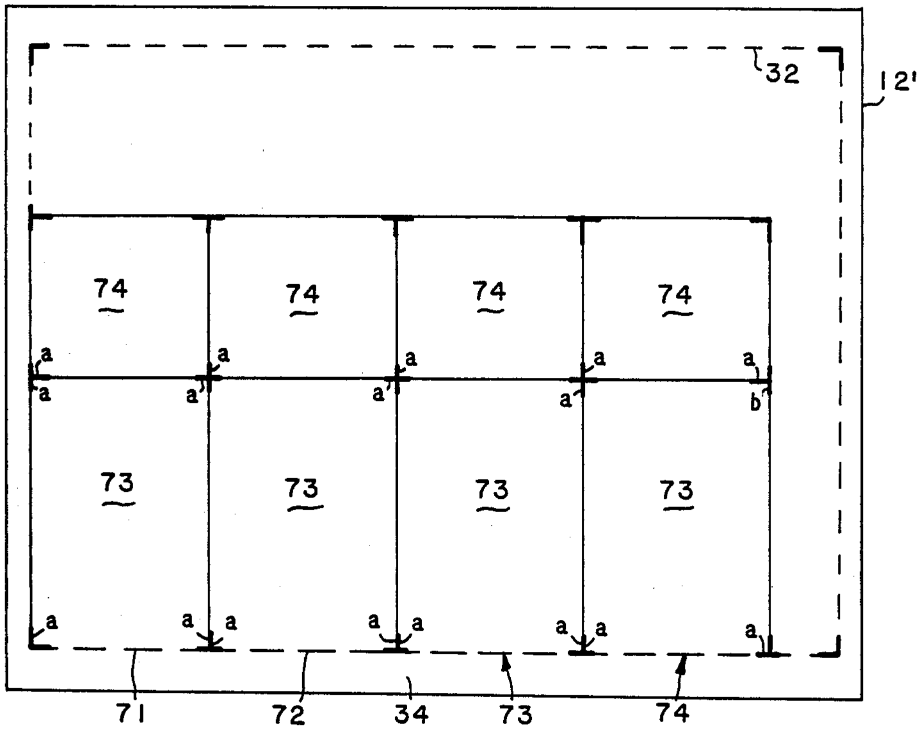

FIG. 5 illustrates an arrangement of four stacks (designated 70, 71, 72 and 73, respectively) of documents, each of which includes a certificate 73 (5 inches wide and 3½ inches tall), and a card 74 (3 inches wide and 3½ inches tall). Each certificate/card set forms a separate stack, and the bottom of each stack lies along the lower edge of area 32. The arrangement in FIG. 6 shows two sets designated 80, of documents. Each set includes a tall (8 inch) card 82 and two shorter (3 inch) cards 83, 84; all the cards are 3½ inches wide. As shown each set is arranged in an "L" shaped layout and comprises one stack, 85 or 87, including a tall card 82 and a short card 83 and a second stack, 86 or 88, including only a short card 84. Tee two "L" shaped set layouts are placed side by side on bed 12, with the bottom edge of each set lying along the bottom of area 32 and the right side of set 80 abutting the left side of set 81.

In each of the arrangements shown in FIGS. 2-6, the correct position of the various envelopes, cards, etc. on the plotter writing bed 12 is indicated by locating marks a, b. As shown, a corner locating mark a (comprising a right angle the two sides of which are ½ inch long) is provided at each corner of an item within the writing area 32. When, as in FIGS. 3 and 4, a portion of the item to be written on lies within one of the top and bottom mrrginal areas 32 a vertical edge locating mark b is daawn along each edge of theiitem, extending about ½ inch inwardly from the point at which the correctly placed item crosses into the marginal area.

It will be evident from FIGS. 2 and 6 that the locating marks for all of the items (including envelope flaps) are drawn as if the item were a rectangle having the same overall height and width. Also, documents (such as envelopes) which include two distinct areas to be written (e.g., the envelope front address and the envelope flap return address) are outlined as if they were as separate items, even though the two areas may be physically attached.

FIGS. 7-10 are flow diagrams illustrating the manner in which the system of the present invention provides the indicating marks necessary to position one or more items to be written on plotter writing bed 12.

Figure 7:
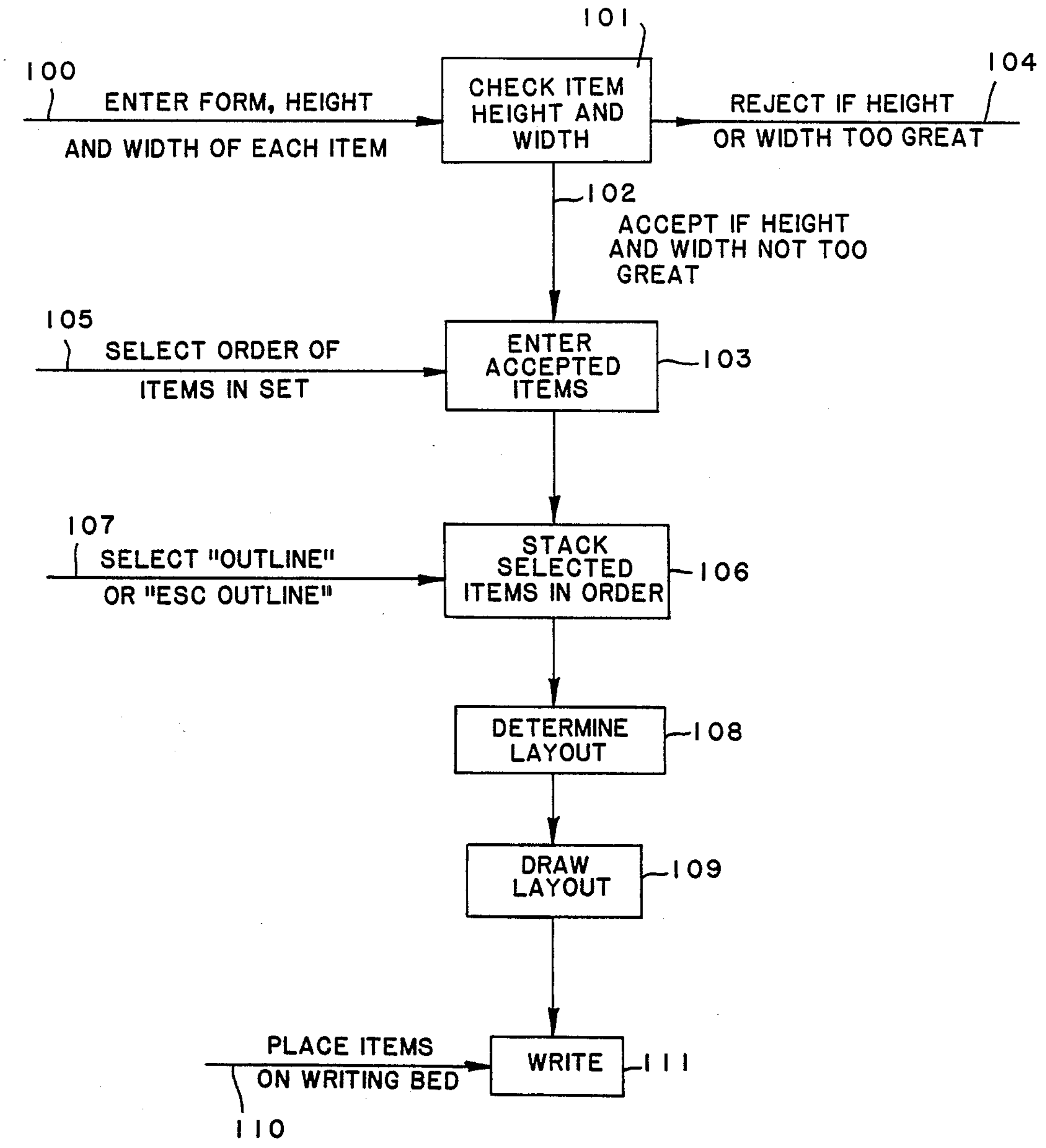

Referring first to FIG. 7, a user first (step 100) enters the overall height and witth of each item, together with "form" information indicating the type of item and extent of writing to be done thereon (e.g., an envelope with a centered three to five line front address and an envelope flap with a centered three to five line return address), into the memory of computer 26. The computer compares the overall height and width of the item with the overall height and width of writing area 32 (step 101). If the item will fit within area 32, it is accepted (step 102) and the item height, width, and form information is entered in the computer's memory (step 103). If the height or width is too great the item is rejected (step 104).

This procedure is repeated for as many items as the user wishes to enter into the computer, even though some of the items may not be written until some time in the future.

When all the desired items have been entered, the user then selects (1) which of the items entered are to be written in the next writing cycle (hereafter the selected items to be written are referred to as the "set" of items) and (2) the order in which the items of each set are to be placed on the writing bed (step 105). In response, the computer arranges the data for the items forming the set in the selected order (step 106).

As is evident, a "set" may include either a single item or a number of different items. By way of example, the sets, and order of items within each set, in the various arrangements shown in FIGS. 2-6 are as follows:

| FIG. | Item(s) in "Set", in Order |
|---|---|
| 2 | Table card |
| 3 | Envelope front, envelope flap |
| 4 | Outside envelope (front and flap), inside envelope (front and flap), invitation, reception card |
| 5 | Certificate, card |
| 6 | Tall card, short card, short card |

Next, the system user enters either an "outline" or "esc outline" command (step 107), and the computer determines the layout of the selected items on the plotter writing bed (step 108) and causes pen 34 to draw the indicating marks for the layout (step 109).

After the indicating marks for the layout have been drawn, the selected items are placed on the writing table 12 in the indicated positions (step 110). The computer 28 then writes the desired name, address or other desired indicia on the various items (step 111), in the conventional manner.

It will be noted that the layout procedure of steps 101–109 insurss that the various items are correctly aligned relatvve to the pen 30. Since the pen 30 both draws the layout and writes the desired indicia, any offset of the pen point relative to the center position of the pen holder of carriage 22 is automatically corrected for. This self-aligning is particularly important when asymmetrical calligraphic pens are used to fill in blanks on preprinted diplomas or similar certificates.

The procedure followed by the computer in performing step 108 is generally as follows:

a. In response to an "outline" command, computer 24 determines an arrangement in which the items forming the "set" can be positioned on writing bed 12 in the order specified by the user. The first item of the set is positioned at the lower left corner of the writing bed. Subsequent items in the set are positioned on top of proceeding items insofar as they will fit, and at the bottom of the next stack to the right if they will not.

b. In response to an "esc outline" command, the computer determines the layout for one set, and then determines how many more sets can (consistent with the procedure described below) be positioned on writing bed 12 at the same time.

During step 109 ("Draw Layout") the procedure followed by the system is generally as follows:

a. If the command given by the user in step 107 was "outline", after the layout of one complete set has been determined in step 108, the computer causes pen 34 to move relative the writing table as required to draw on the writing table bed 12 (or on paper 12' on the table) the position indicating marks for each of the items of the one set.

b. If the command given by the user in step 107 was "esc outline", after the number of sets that can be placed (consistent with the procedure described in more detail below) on writing bed 12 at once has been determined (in step 107), the computer causes the pen to draw position indicating marks for each of the items of each of the sets (step 108).

As already indicated, corner indicating marks a are drawn to indicate the proper position for each of the four corners of each item that is to be placed entirely within the bounds of area 32; two corner indicating marks a and two vertical edge indicating marks b are drawn to indicate the proper position for each item that is placed partially within area 32 and partially within marginal areas 34.

Figure 8:
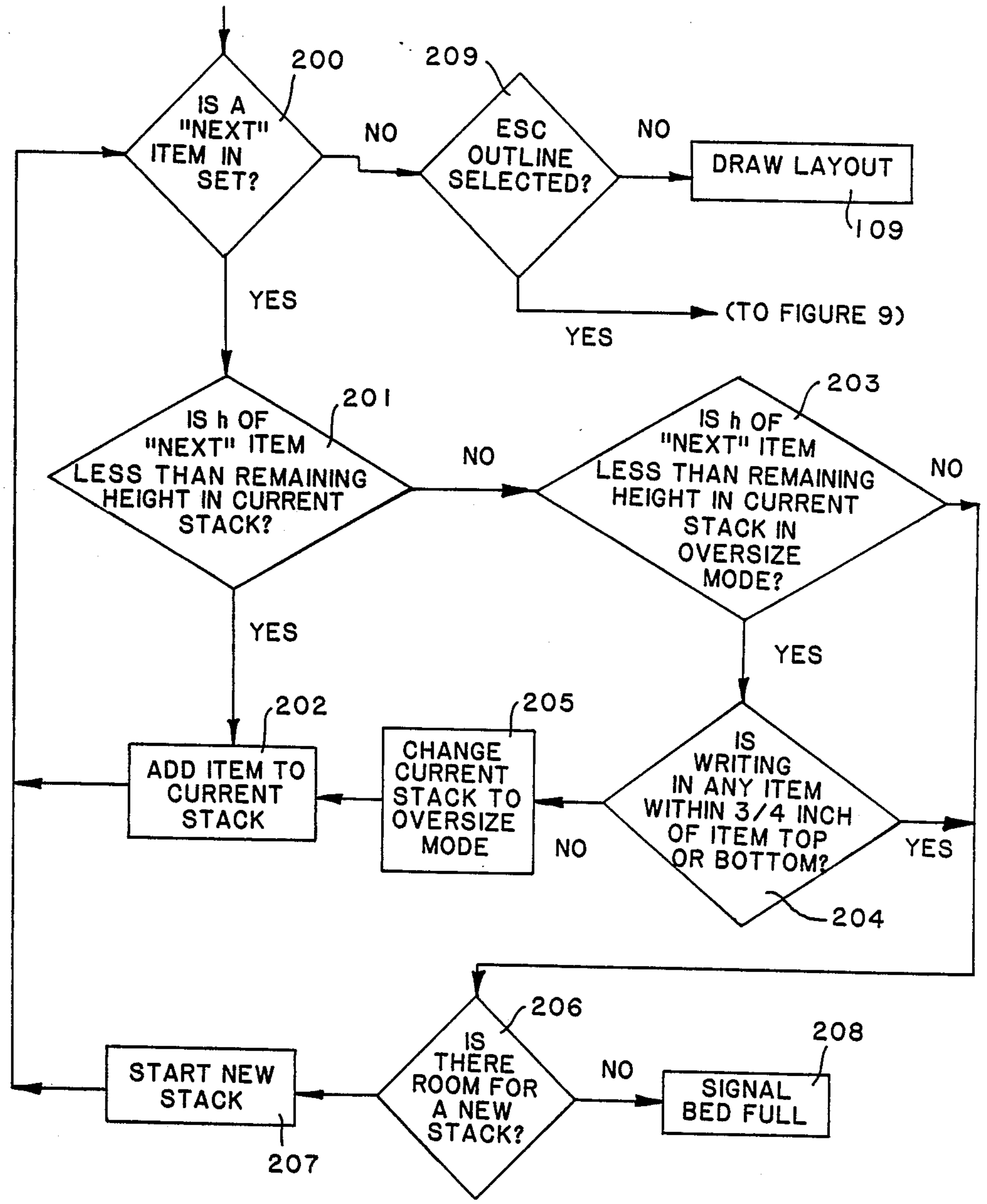

The procedure followed during steps 108 and 109 is shown in more detail in the flow chart of FIGS. 8–10.

Referring first to FIG. 8, the first step (step 200) is to read the list of items in the set (it will be recalled that the computer stacked the selected items to be written in order in step 106) to determine if all the items in the set have already been positioned in the layout, or if there is still a "next" to-be-positioned item in the set. In the case of the first item in the set, the answer will always be "Yes"; thefirst item is the "next" item. After all the items in the set have been positioned in the layout, the answer will be "No".

If there is a "next" item, i.e., the answer to step 200 is "Yes", the computer (step 201) determines whether the height of the "next" item is such that, if the "next" item is placed on top of the last item positioned, the "next" item will fit entirely within writing space 32. The first item in any "set" will always so fit; the overall height and width of the item was compared to the overall height and width of writing space 32 when the item was initially entered into the system. Subsequent items may or may not fit. If, for example, the first item was 8 inches tall and the "next" item is 5 inches high, the "next" item is about 2 inches too tall to fit in writing space 32 above the first item. If, on the other hand, the "next" item is only about 2 inches high, it will fit in the about 3 inch space remaining above the first item.

If the answer to step 201 is "Yes", the computer places the "next" item in the current stack in the layout, on top of the next proceeding item (step 202), and then returns to step 200 to determine if there are any more items in the set to be positioned.

If the answer to step 201 is "No", i.e., the "next" item is too tall to be placed on top of the current stack, the computer must determine whether the "next" item would fit on the current stack if use were made of the marginal areas 34, i.e., whether the "oversize" positioning mode should be employed. This involves two steps. First, the computer determines (step 203) whether the "next" item will physically fit on top of an "oversize" mode current stack; i.e., would there be enough space if the overall height of the stack was 12½ inches (including the marginal areas 34) rather than 11 inches (the height of writing area 32). If the "next" item would physically fit in an oversize stack, the computer then insures than no portion of the top or bottom items in the stack on which any writing must be done would be positioned within the marginal areas 34. For simplicity in programming, this may be accomplished by determining (step 204) whether any of the items in the set have writing within ¾ inch of their top or bottom. If not, in step 205 the manner in which items are placed in the current stack is changed to the "oversize" mode (in which the stack is vertically centered on writing table 12 (i.e., the center of the stack is 5½ inches from both the top and bottom, of writing area 32) from the standard mode (in which the bottom edge of the bottom item in the stack is placed along the lower edge of writing area 32), and the item is then added to the current stack (step 202). In preferred embodiments, the system determines whether the "oversize" mode will be used in a somewhat more complicated manner; in a number of steps corresponding to step 204 it determines (a) whether there is to be writing in the bottom ¾ inch of the bottom item in the stack and (b) whether there is to be writing in the top ¾ inch of the "next" item possibly to be added at the top of the oversize mode stack.

If the oversize mode is not to be used (i.e., either the answer to step 203 is "No" or the answer to step 204 is "Yes"), the computer must then determine whether there is room to start a new stack at the right of the then current stack (step 205). If there is room, i.e., the remaining space between the right edge of the current stack and the far right edge of writing area 32 is greater than the width of any remaining items in the set, the answer to step 206 is "Yes"; and the "next" item is positioned as the first item in a new stack (step 207), with its left edge vertically aligned with the far right edge of the items in the stack immediately to its left (or aligned with the left edge of writing area 32 in the case of the first stack), and with its bottom edge at the bottom of writing area 32. The new stack becomes the "current stack", and the system returns to step 200 to determine whether there are any more items in the set to be positioned.

If the answer to step 206 is "No", i.e., there is not room for another stack, the computer signals that the writing bed is full (step 208), and that all the selected items forming the set cannot be positioned on the writing bed at once.

Once all the items in the set have been positioned (i.e., the answer to step 200 is "No"), the computer proceeds (step 209) to determine if only a single set is to be positioned on the writing bed (i.e., an "outline" command was given in step 107), or if multiple sets are to be positioned (i.e., the command given in step 107 was "esc outline") If "esc outline" was not selected, the computer proceeds (step 109) to cause the pen to draw indicating marks for each item in the set. If "esc outline" was selected, the computer proceeds (as discussed in more detail below with reference to FIGS. 9 and 10) to determine how many, if any, additional sets can be positioned on writing bed 12.

In determining whether multiple sets can be positioned on the writing table, the uust-determined arrangement of the first entire "set" is of critical importance. To insure, among other things, that only complete sets are written during each writing cycle, the system 10 determines how many times the overall layout of the entire first set (determined in steps 200–207) can be repeated, *not* how many additional sets might fit, if the items of the additional sets were positioned item-by-item.

Thus (and with reference to FIG. 9), the first step (step 210) in attempting to position additional sets is to determine whether the complete set layout determined in the course of steps 200–207 fits in a single stack on writing table 12. If the answer to step 210 is "Yes" it must then be determined (step 211) whether another (and identically layed-out) set will fit on top of the current stack. If the answer to step 211 is "Yes", the next set is so positioned (step 212); and the process continues until there is no longer room for another set in the current stack.

If the answer to step 211 is "No", i.e., another set will not fit in the current stack, the system could determine whether another set could be placed in the current stack in the oversize mode (steps 213 and 214), using essentially the same procedure as described earlier with reference to steps 20 and 204. In step 213, it would be determined whether the additional $1\frac{1}{2}$ inch of vertical height provided by the oversize mode would provide the physical space required for another set; step 204 would determine whether the possible writing in the top or bottom $\frac{3}{4}$ inch of any item in the set might make the use of the oversize mode inappropriate. Following this procedure, if the answer to step 213 is "Yes" and that to step 214 is "No", the arrangement of sets/items in the stack would be changed to the oversize mode (step 215) and the additional set would be positioned on top of the current (now oversize mode) stack.

If either the answer to step 213 is "No" or the answer to step 214 is "yes," the use of the oversize mode would not be possible or appropriate, and another set could be positioned on table 12 only if there is room for a new stack.

In the preferred practice of the invention, the only determination whether the oversize mode will be employed is when the layout for the first set is being determined (steps 203 and 204); if the answer to step 211 is "No", the system skips steps 213 and 214, and proceeds directly to step 216 in which the system determines there is room for another stack on the writing table.

In the more detailed procedure described above with reference to steps 213 and 214, the system proceeds to step 216 if either the answer to step 213 is "No" or that to step 214 is "Yes." In either procedure, if the answer to step 216 is "Yes", the next set is positioned as the first set in (and at the bottom of) a new stack (step 217). If the previous stack was changed to oversize (step 215) when placing the maximum possible number of sets in it, the new stack will become "oversize" also.

Again, the procedure continues, set-by-set, stack-by-stack, until it is determined (1) in step 211 there is no room for another set in the then-current stack, whether standard or oversize, and (2) in step 216 that there is no room to start a new stack. When this condition is reached, the system (step 109) causes the pen to draw the layout (i.e., draw the indicating marks) for each item in each set whose position has been determined.

Referring now to FIG. 10, there are circumstances (e.g., FIGS. 4 and 6) in which layout determined (in steps 200–207) for the first set of items included more than a single stack. In such circumstances the answer to step 210 is "No"; and the system will place additional sets only if it can do so by replicating the already-determined set layout with the first item of each additional set at the bottom of a new stack. The system will not permit a new more-than-one-stack set to be positioned with its first item set in the middle of an existing stack.

Thus, when attempting to position a second or subsequent more-than-one-stack-set, the system first determines (step 218) whether there is sufficient space remaining to place the already determined set layout in open stack space. If the answer is "yes," and it will be seen that the "sufficient space" requirement will always require enough room for at least two new stacks, the system pssitions (step 219) an additional new set in the open stack space with the bottom of the set aligned with the bottom of space 32 (or, if the original layout employed the "oversize" mode, centered in space 32) and its left edge abutting the vertical right edge of the proceeding set.

This procedure (steps 218 and 219) continues until the system determines there is no longer space for an additional set, at which point the system (step 109) draws locating marks for each item of each set that has been positioned.

The operation of the system according to the flow charts of FIGS. 7–10 will now be further illustrated with reference to the layouts of FIGS. 2–6.

In the FIG. 2 arrangement, each "set" includes one card 40. The card/set 40 is posttioned at the lower left corner of writing area 32 (steps 200–202). After the first card has been positioned, the answer to step 200 is "No"; since multiple sets are to be positioned, "esc outline" was selected and the answer to step 209 is "yes." Successive sets (i.e., successive cards 40) are then positioned on top of the first set, according to steps 210–212 until there is no longer any room in the first stack 41 for any more card sets. At this point, the answer to steps 211, 213, 214 and 216 will be, respectively, "No", "Yes", "Yes" and "Yes" [in the procedure of the preferred embodiment in which no inquiry is made regarding the use of the "oversize" mode, steps 212 and 213 are omitted], and a new stack (stack 42) is started. The process continues until no further sets will fit in stack 43, at which point there also is not sufficient space to start an additional stack (i.e., the answer to step 216 is "No"; the computer then (step 109) moves the pen to draw the indicating marks a, b shown in FIG. 2. Here, it should be pointed out that the cross-shaped mark where four card corners abut each other comprises four corner marks a, each of which forms one quadrant of the cross.

In FIG. 3, each set includes an envelope 50 which, as indicated previously, includes a body portion 50*a* (on which the address's name and address will be written) and a flap portion 50*b* (on which the return address will be written). The system treats the two portions as separate items since, among other things, the writing on the flap is upside down and backwards as compared with that on the front; and the body and flap are entered into the memory of computer 24 as two items, in (steps 100–106), first the body (item 50*a*) and then the flap (item 50*b*).

In positioning envelopes 50, the system first positions envelope body 50*a* (the first item in the set) tt the lower left corner of the writing bed, and then places the envelope flap 506 (the second item in the set) on top of it (steps 200–202). When the flap has been placed, the step 200 indicates that there are no further items in the set, and the system inquires if "esc outline" has been connected (step 209). If, as in the area of the FIG. 3, the answer is "Yes", the system proceeds (FIG. 8) to steps 210 and 211, in which the answers are, respectively, "Yes" and (since the set, i.e., the complete envelope, is over 5½ inches tall) "No".

A second set will not fit in a standard 11 inch high stack. If the procedure shown in FIGS. 8–10 is followed, the next steps (213 and 214) determine whatever use of the oversize mode is appropriate; and in the FIG. 3 situation, it is. Another set (i.e., another complete envelope 50) will fi in an oversize height stack (hhe answer to step 213 is "Yes") and there is no writing too close to the top or bottom of the envelope body or flap (the answer to step 214) is "No". The system then changes the stack to "oversize" (step 215), position the second envelope 50 in stack 51 (step 212), and returns to step 211.

Since a third set will not fit in stack 51, in either regular oversize or regular mode, the next answer to steps 211 and 213 is "No". There is, however, room for a new stack (step 206) so the third set is placed at the bottom of stack 52; and, in the next cycle of steps 211, 213, 214, 215 and 212, stack 51 is changed to oversize and a second set placed in it.

As will be evident from FIG. 3, more than four envelopes 50 cannot be placed on table 12. After the second envelope/set has been placed in stack 51, the answers to steps 211, 213 and 210 will be "No", and the system will draw the indicating marks (shown in FIG. 3) for the four sets.

With respect to FIG. 3, it will be noted that if, as in the preferred practice of the present invention, steps 212 and 213 were not employed, only two sets (one in each stack) would be placed on table 12.

FIG. 4 illustrates the placement of a six-item set. The first three items, the body 61*a* and flap 61*b* of envelope 61 and the body 62*a* of envelope 62, are positioned in the first stack 64 by following steps 200–202 in the manner previously discussed. Since the fourth item, the flap 62*b* of envelope 62, will fit in stack 64 only in the oversize mode it is positioned by (in order) steps 200, 201, 203, 204, 205, and 202.

After the flap 62*b* has been placed, stack 64 is full. In positioning invitation 60, the answer to steps 200, 201, 203 and 206 are, respectively, "Yes", "No", "No" and "Yes"; and step 207 positions the invitation at the bottom of new stack 65. Since it is the first item in the new stack, the invitation 60 is positioned with its bottom at the bottom of writing space 32 and its left edge at the far right edge of stack 64 (which in this instances is the far right edge of the body 61*a* of envelope 61. The last item in the set, card 63, is then positioned (steps 200–202) on top of invitation 60, with (as previously indicated), its left edge aligned with that of envelope 60.

If "outline" was commanded (step 209) the system will then proceed (step 109) to draw the FIG. 3 layout. If "esc outline" was commanded (step 209), the system will determine (steps 210, 218) that another complete set will not fit in table 12, and will then proceed (step 109) to draw the layout.

FIG. 5 illustrates the placement of four sets (one in each of stacks 71, 72, 73, 74), each of which includes a tall card 73 and a short card 74.

The poocedure set forth in the flow charts of FIGS. 7–9 determines that one set will fit in each stack and that four stacks will fit on the writing table 12. All the stacks are in standard (rather than oversize) mode; and the system draws the indicating marks shown when, after placement of the set in stack 74, it is determined no more stacks will fit on the table.

FIG. 6 illustrates the placement of two sets, each of which includes a full card 82 and two short cards 83 and 84. In making the layout shown in FIG. 6, system 10 a. places card 82 (the first item) at the bottom of stack 85 (steps 200–202),
b. places card 83 on tops of and 82 in stack 85 (steps 200–202),
c. places card 84 at the bottom of stack 86 (steps 200, 201, 203, 206, 207),
d. determines that card 84 was the last item in the set (step 200) and that "esc outline" was selected (step 209),
e. determines that the complete set does not fit in a single stack (stack 211),
f. determines that there is room for an additional set in the layout (step 218),
g. places the additional set in stacks 87 and 89 (step 219),
h. determine that there is not room for a third set (step 218), and
i. draws the layout (step 109).

OTHER EMBODIMENTS

As previously indicated, other embodiments may use different procedures to determine whether the oversize mode is to be employed.

Similarly, in other embodiments the computer, rather than the user, may determine the most efficient arrangement of the items of a "set"; and multiple sets may be positioned item-by-item rather than on the basis of the arrangement determined for the first set.

These and other embodiments will be within the scope of the following claims.

What is claimed is:

1. In a writing system including a writing bed, a pen or other writing means attached to the bed for movement relative thereto for writing on an item supported on said bed, and a computer or other processor for controlling movement of the pen or other writing means relative to the bed, that improvement comprising:

first means responsive to data representative of the height and width of said item for determining a preferred location of said item on said bed, and second means for causing said pen or other writing means to draw on said bed a plurality of positioning marks which indicate the proper location of a plurality of edge portions of said item when said item is in said preferred location.

2. The system of claim 1 wherein each of said positioning marks includes a straight line segment parallel to an orthogonal direction of movement of said writing means relative to said bed, each of said line segments being drawn on said bed at a location which indicates the proper location of an edge of said item.

3. The system of claim 2 wherein said system includes means for moving said writing means through a generally rectilinear area of height and width not greater than that of said bed, and for causing said writing means to draw a right angle positioning mark to indicate the proper location of each corner of said item when said preferred location of said item is not outside the bounds of said rectilinear area.

4. The system of claim 3 wherein said second means causes said writing means to draw a said positioning mark to indicate the proper location of each edge portion of said item which is adjacent a boundary of said rectilinear area.

5. The system of claim 1 wherein said second means causes said writing means to draw a said plurality of positioning marks to indicated the proper location of the edge portions of each of a plurality of said items in response to data representative of the height and width of each of said items.

6. The system of claim 5 wherein the said preferred locations of two of said items are such that an edge of one of said items abuts an edge of the other of said items.

7. In a writing system including a writing bed, a pen or other writing means attached to the bed for movement relative thereto for writing on an item supported on said bed, and a computer or other processor for controlling movement of the pen or other writing means relative to the bed, that improvement comprising: first means responsive to data representative of the height and width of each of a plurality of said items for (i) determining the preferred location for a first one of said items, (ii) thereafter determining if a second of said items can be positioned on said writing bed in a first stack extending in one orthogonal direction such that an edge of said second item abuts an edge of said one item perpendicular to said one orthogonal direction and a pair of side edges of said items are parallel to said orthogonal direction and are aligned with each other, and (iii) if said second item can be so positioned, determines a preferred location of said second item in said item stack with said edges of said items so positioned, and second means for thereafter causing said writing meas to draw on said bed a said plurality of positioning marks which indicate the proper location of edge portions of said first item and of said second item of said second item can be so positioned, thereby to indicate the said preferred location of each of said items.

8. The system of claim 7 wherein, if said second item cannot be so positioned, said first means (i) determines if said second item can be positioned on said writing bed in a second stack spaced from said first stack in a direction perpendicular to said one orthogonal direction, the edge of said second item stack in said one orthogonal direction nearest said first item stack abutting the adjacent edge of said first stack, and (ii) if said second item can be so positioned in a second stack, determines a preferred location of said second item in said second stack, and (iii) said second means thereafter causes said writing means to draw a first plurality of positioning marks to indicate the preferred location of said first item in said first stack and a second plurality of positioning means to indicate the preferred location of said second item in said second stack.

9. The system of claim 8 wherein said items have the same overall height and width and said first means is arranged to repeat the determinations of claims 7 and 8 with respect to successive ones of said items until said said first means determines that no further items can be placed in any existing said stack and that there is not room on said bed for any additional stack.

10. In a writing system including a writing bed, a pen or other writing means attached to said bed for movement relative thereto for writing on an item supported on said bed, and a computer or other processor for controlling movement of the pen or other writing means relative to the bed, that improvement comprising:

(a) means for storing daaa representative of the height and width of each of the items of a set comprising a plurality of different items, (b) means responsive to said data for determining a preferred layout of the items of said set and a preferred location of a first said layout on said bed and (c) means for determining whether a second said layout can be positioned on said bed, and (d) means for causing said writing means to draw on said bed a plurality of positioning marks which indicate the proper location of edge portions of at least one of said items of a said set when the layout including said set is in the said preferred location thereof.

11. The system of claim 10 including means for drawing positioning marks indicating the proper location of each of said items of each of said sets.

12. The system of claim 11 including means for determining (a) whether the layout including all the items of said set includes items arranged in only one orthogonal direction and, (b) if so, whether said second layout can be arranged abutting said first layout in said one orthogonal direction.

13. The system of claim 12 wherein, said last mentioned means determines if said layout includes items arranged in more than one orthogonal direction and if so then determines if said second layout can be arranged with the first item therein adjacent an edge of the writing area of said bed.

14. The system of claim 1 wherein said second means causes said writing means to write on a said item positioned in the said preferred location thereof.

15. In the process of positioning an item to be written on the writing bed of a system of the type including an x-y plotter, a pen or other writing means mounted for movement relative to the plotter, and a digital computer for controlling movement of the pen relative to the writing bed, that improvement including self-aligning said pen relative to said item by:

(a) entering the height and width of the item into the memory of the computer;

(b) causing the computer to determine a preferred location on said bed of said item;

(c) causing said pen or other writing means to draw positioning marks on said bed, said positioning marks indicating the location of each portions of said item on said bed in said preferred location;

(d) placing said item on said bed in said preferred location; and (e) causing said pen or other writing means to write indicia on said item.

16. The process of claim 15 including the step of determining a preferred location of each of a plurality of items, causing said pen or other writing means to draw positioning marks indicating the location on said bed of each of said plurality of items, placing said plurality of items on said bed, and causing said pen to write indicia on each of said items.

* * * * *